(12) United States Patent
Matsumoto

(10) Patent No.: US 12,732,269 B2
(45) Date of Patent: Sep. 8, 2026

(54) MONITORING SYSTEM, MONITORING DEVICE, AND MONITORING METHOD

(71) Applicant: NEC Corporation, Tokyo (JP)

(72) Inventor: Keiichi Matsumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 282 days.

(21) Appl. No.: 18/413,745

(22) Filed: Jan. 16, 2024

(65) Prior Publication Data

US 2024/0275481 A1 Aug. 15, 2024

(30) Foreign Application Priority Data

Feb. 10, 2023 (JP) ................................ 2023-019219

(51) Int. Cl.
*H04B 10/077* (2013.01)

(52) U.S. Cl.
CPC ................................ *H04B 10/0771* (2013.01)

(58) Field of Classification Search
CPC ................ C12Q 1/6837; C12Q 1/6888; C12Q 2600/156; G06F 18/23; G16B 20/20; G16B 20/30; G16B 25/20; G16B 40/30; G16B 50/00; H04B 10/0771; H04B 10/0791; H04J 14/052; H04J 1/00; H04J 3/00; H04J 4/00; H04J 7/00; H04J 9/00; H04J 11/00; H04J 13/00; H04J 14/00; H04J 99/00; H04J 2203/00; H04J 2211/00
See application file for complete search history.

(56) References Cited

U.S. PATENT DOCUMENTS 9,252,872 B2 2/2016 Hamaguchi et al.
2004/0146305 A1* 7/2004 Neubelt ............... H04B 10/071 398/173
2014/0086573 A1* 3/2014 Zhang ................. H04B 10/071 398/16

FOREIGN PATENT DOCUMENTS

JP 2014165595 A * 9/2014 .......... H04J 14/0275
WO WO-2013157245 A1 * 10/2013 ......... H04B 10/2589
WO WO-2022001518 A1 * 1/2022 ............ H04J 14/052

OTHER PUBLICATIONS

Nakagawa, Mayu; Ohzeki, Masaki; Takenaga, Katsuhiro; Ichii, Kentaro, âNovel inter-core crosstalk measurement method using loopback and bidirectional OTDR technique,â Proc. ECOC 2022 â 48th European Conference on Optical Communication, paper Tu4A. 4, 2022, 4 pp. (Year: 2022).*

(Continued)

*Primary Examiner* — David C Payne
*Assistant Examiner* — Mohammed Abdelraheem

(57) ABSTRACT

A monitoring system includes a monitoring device including an optical transmitter and an optical receiver, an optical repeater, and a first MCF transmission path and a second MCF transmission path, each of the paths includes cores, and connects the monitoring device and the optical repeater with each other via the plurality of cores, the optical transmitter generates an optical pulse, and inputs the optical pulse to a first core included in the cores of the first MCF transmission path, the optical repeater loops-back the optical pulse being received from the first core to a second core included in the cores of the second MCF transmission path, and the optical receiver receives the optical pulse being looped-back, as an optical reception pulse, from the cores of the second MCF transmission path, and calculates a corrected reception level, based on the optical reception pulse.

20 Claims, 10 Drawing Sheets

(56) References Cited

OTHER PUBLICATIONS

Extended European Search Report for EP Application No. 24155613.3, dated on Jul. 2, 2024.

Mayu Nakagawa et al., “Novel Inter-core Crosstalk Measurement Method Using Loopback and Bidirectional OTDR Technique”, 2022 European Conference on Optical Communication (ECOC), OPTICA, Sep. 18, 2022, pp. 1-4.

* cited by examiner

MONITORING SYSTEM 10
OPTICAL REPEATER 200
MONITORING DEVICE 150
MONITORING DEVICE 100
201
202
203
204
205
MCF TRANSMISSION PATH 300
MCF TRANSMISSION PATH 400

RECEPTION LEVEL
REFERENCE LEVEL
TIME
P201
P202
P203
P204
P205
OPTICAL RECEPTION PULSE FROM CORE 411
OPTICAL RECEPTION PULSE FROM CORE 412
OPTICAL RECEPTION PULSE FROM CORE 413
OPTICAL RECEPTION PULSE FROM CORE 414

Fig.5

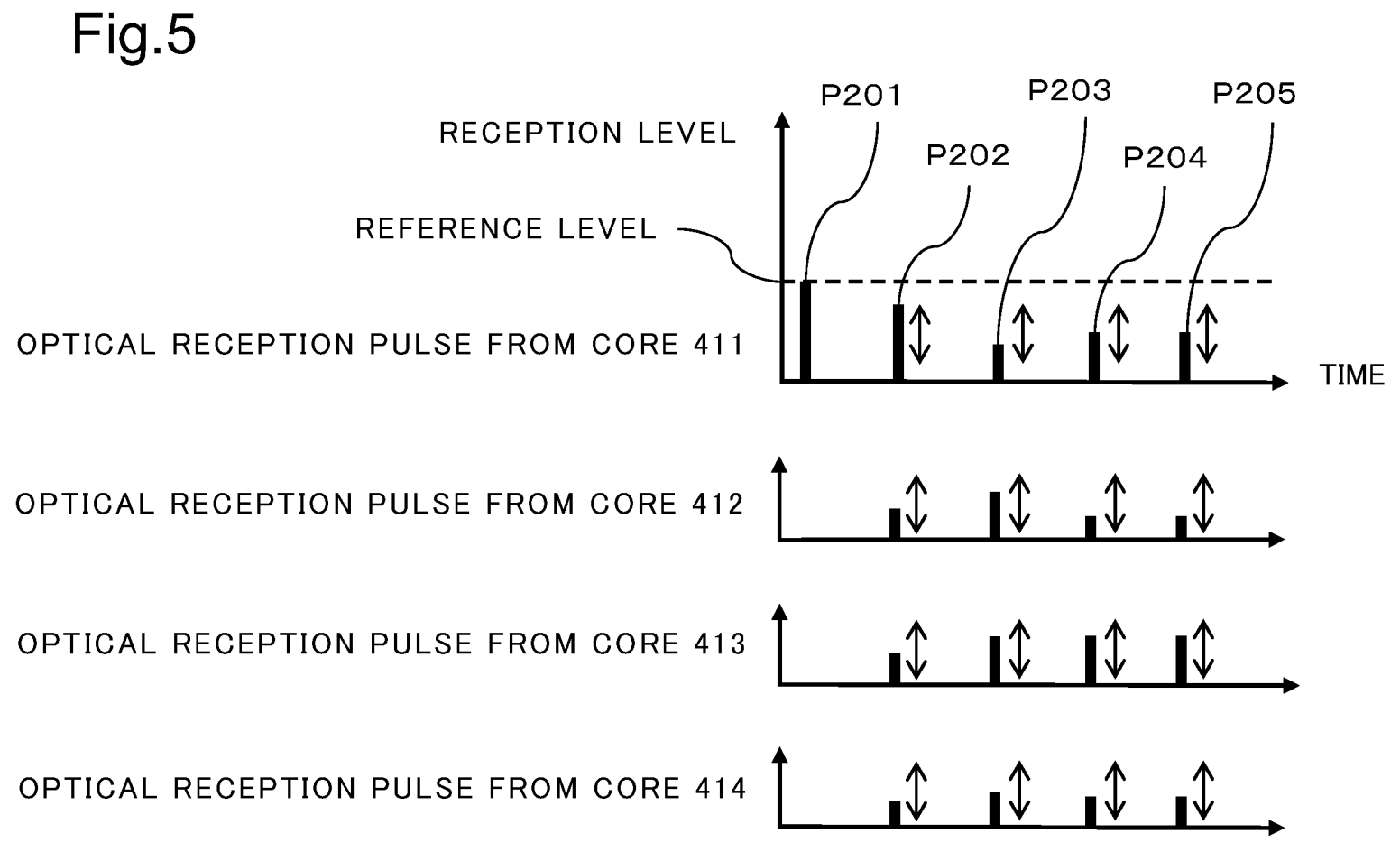

RECEPTION LEVEL

REFERENCE LEVEL

TIME

P201

P202

P203

P204

P205

OPTICAL RECEPTION PULSE FROM CORE 411

OPTICAL RECEPTION PULSE FROM CORE 412

OPTICAL RECEPTION PULSE FROM CORE 413

OPTICAL RECEPTION PULSE FROM CORE 414

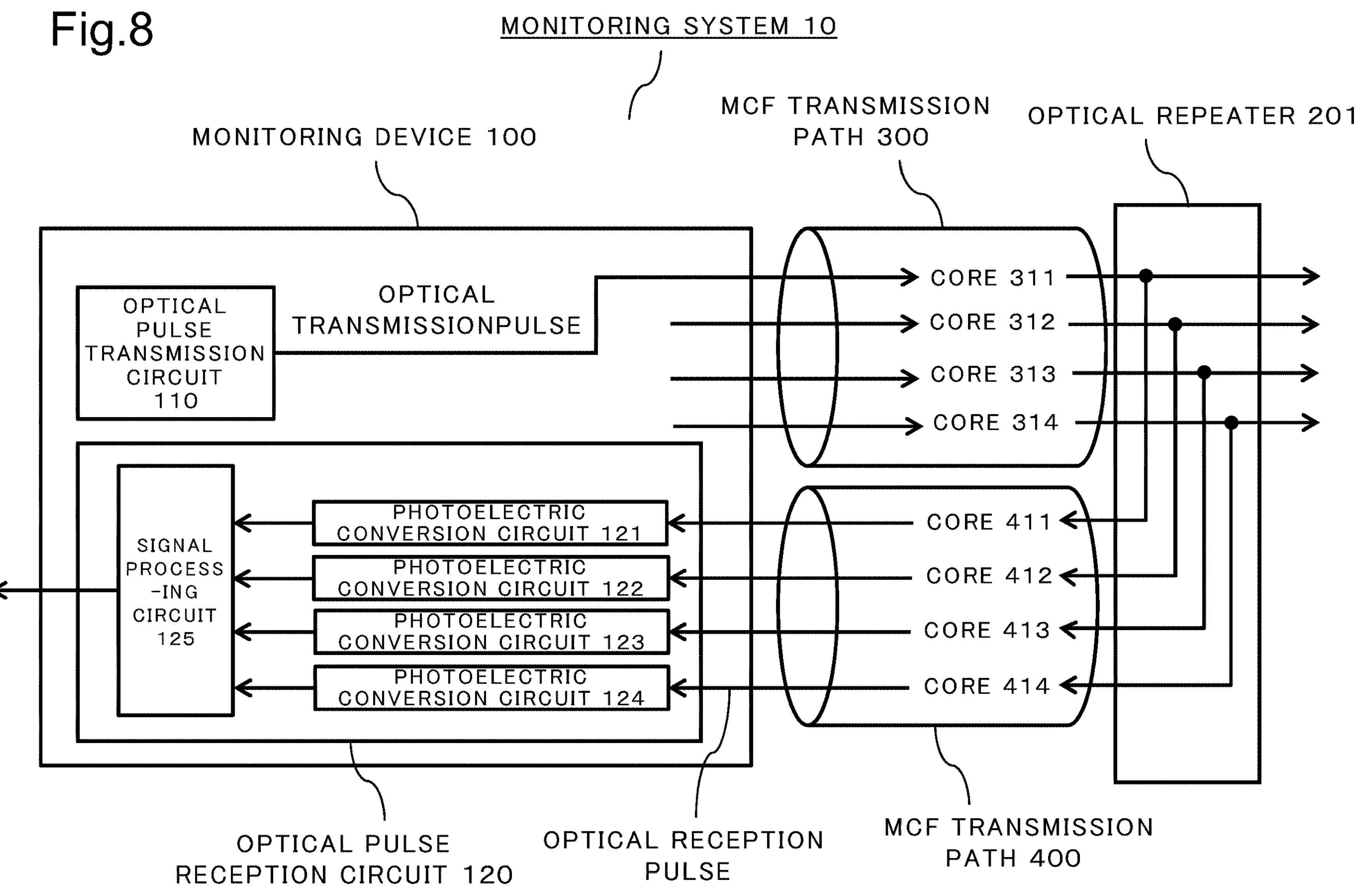
Fig.8
MONITORING SYSTEM 10
MONITORING DEVICE 100
MCF TRANSMISSION PATH 300
OPTICAL REPEATER 201
OPTICAL PULSE TRANSMISSION CIRCUIT 110
OPTICAL TRANSMISSIONPULSE
CORE 311
CORE 312
CORE 313
CORE 314
CORE 411
CORE 412
CORE 413
CORE 414
SIGNAL PROCESS -ING CIRCUIT 125
PHOTOELECTRIC CONVERSION CIRCUIT 121
PHOTOELECTRIC CONVERSION CIRCUIT 122
PHOTOELECTRIC CONVERSION CIRCUIT 123
PHOTOELECTRIC CONVERSION CIRCUIT 124
OPTICAL PULSE RECEPTION CIRCUIT 120
OPTICAL RECEPTION PULSE
MCF TRANSMISSION PATH 400

RECEPTION LEVEL
THRESHOLD LEVEL
RECEPTION LEVEL (CORE 411)
DISTANCE
RECEPTION LEVEL (CORE 412)
DISTANCE
RECEPTION LEVEL (CORE 413)
DISTANCE
RECEPTION LEVEL (CORE 414)
DISTANCE
SUMMING
THRESHOLD LEVEL
CORRECTED RECEPTION LEVEL
DISTANCE
P201
P202
P203
P204
P205

MONITORING DEVICE 101
OPTICAL PULSE TRANSMISSION CIRCUIT 110
OPTICAL TRANSMISSION PULSE
DETERMI -NATION CIRCUIT 130
SIGNAL PROCESS -ING CIRCUIT 125
PHOTOELECTRIC CONVERSION CIRCUIT 121
PHOTOELECTRIC CONVERSION CIRCUIT 122
PHOTOELECTRIC CONVERSION CIRCUIT 123
PHOTOELECTRIC CONVERSION CIRCUIT 124
OPTICAL PULSE RECEPTION CIRCUIT 120
OPTICAL RECEPTION PULSE

MONITORING DEVICE 102
MCF TRANSMISSION PATH 300
OPTICAL PULSE TRANSMISSION CIRCUIT 110
OPTICAL TRANSMISSION PULSE
OPTICAL SWITCH 140
CORE 311
CORE 312
CORE 313
CORE 314
SIGNAL PROCESS -ING CIRCUIT 125
PHOTOELECTRIC CONVERSION CIRCUIT 121
PHOTOELECTRIC CONVERSION CIRCUIT 122
PHOTOELECTRIC CONVERSION CIRCUIT 123
PHOTOELECTRIC CONVERSION CIRCUIT 124
OPTICAL PULSE RECEPTION CIRCUIT 120

MONITORING SYSTEM, MONITORING DEVICE, AND MONITORING METHOD

This application is based upon and claims the benefit of priority from Japanese Patent Application No. 2023-019219, filed on Feb. 10, 2023, the disclosure of which is incorporated herein in its entirety by reference.

TECHNICAL FIELD

The present disclosure relates to a monitoring system and the like.

BACKGROUND ART

In order to expand transmission capacity of an optical transmission system, a study using an optical cable including a multi-core fiber (MCF) has been conducted. The MCF can achieve space division multiplexing (SDM) by storing a plurality of cores in one optical fiber, and expand transmission capacity of an optical fiber. As a structure of the MCF, an uncoupled MCF and a coupled MCF have been known. The uncoupled MCF is an MCF having relatively large spacing between cores included in one optical fiber. The uncoupled MCF has less crosstalk between cores, but is hard to increase the number of cores per optical fiber. In contrast, the coupled MCF is an MCF having relatively small spacing between cores included in one optical fiber. The coupled MCF may cause crosstalk between cores, but can increase the number of cores per optical fiber. Therefore, the coupled MCF is suitable for increasing capacity by SDM. An optical fiber transmission path using the MCF is hereinafter referred to as an "MCF transmission path".

In addition, in an optical submarine cable system, a method of monitoring a variation in a level of monitoring light being looped-back by a submarine repeater in order to monitor a state of the submarine repeater and an optical submarine cable has been known. When such monitoring is performed in an optical submarine cable system using an MCF transmission path, monitoring light being output from a transmitter of the monitoring light is output to any of cores of the MCF transmission path. A receiver of the monitoring light measures a level of the monitoring light being looped-back at the submarine repeater. When the level of the measured monitoring light falls below a specified value, it can be estimated that there is a failure on a route of the monitoring light.

Relating to the present disclosure, Japanese Unexamined Patent Application Publication No. 2014-165595 describes a technique being used in a system using an MCF transmission path, as a technique for detecting a failure.

In a coupled MCF, monitoring light leaks to a core to be adjacent (an adjacent core) due to crosstalk between the cores. An amount of the leakage varies in response to an installation situation of an optical fiber, such as an ambient temperature, pressure, and a twist. That is, since monitoring light being input to a certain core leaks to an adjacent core in response to a situation of an MCF transmission path, a reception level of the monitoring light varies due to crosstalk between the cores. As a result, since a variation in the reception level of the monitoring light being caused by a state change of the MCF transmission path overlaps with a variation in the reception level of the monitoring light being caused by leakage of an optical pulse to the adjacent core, there is a possibility that the state change of the MCF transmission path cannot be correctly detected in a receiver of the monitoring light. When the state change of the MCF transmission path cannot be correctly detected, there is also a possibility that erroneous detection of a failure of the MCF transmission path occurs. Therefore, when monitoring the MCF transmission path, it is preferable to be able to reduce an influence caused by crosstalk of the MCF transmission path, particularly an influence of a variation in the reception level of the monitoring light.

An object of the present disclosure is to provide a technique of being able to reduce an influence of crosstalk being included in a reception level of monitoring light in an MCF transmission path.

SUMMARY

A monitoring system according to the present disclosure is an monitoring system including: a monitoring device including an optical transmission means and an optical reception means; an optical repeater; and a first multi-core fiber (MCF) transmission path and a second MCF transmission path, wherein each of the first MCF transmission path and the second MCF transmission path includes a plurality of cores, and connects the monitoring device and the optical repeater with each other via the plurality of cores, the optical transmission means generates an optical pulse, and inputs the optical pulse to a first core included in the plurality of cores of the first MCF transmission path, the optical repeater loops-back the optical pulse being received from the first core to a second core included in the plurality of cores of the second MCF transmission path, and the optical reception means receives the optical pulse being looped-back, as an optical reception pulse, from the plurality of cores of the second MCF transmission path, and calculates a corrected reception level, based on the optical reception pulse.

A monitoring device according to the present disclosure is a monitoring device being capable of connecting to a first MCF transmission path and a second MCF transmission path that each include a plurality of cores, the monitoring device including: an optical transmission means for generating an optical pulse, and inputting the optical pulse to a first core included in the plurality of cores of the first MCF transmission path; and an optical reception means for receiving the optical pulse, as an optical reception pulse, from the plurality of cores of the second MCF transmission path, and calculating a corrected reception level, based on the optical reception pulse.

A monitoring method according to the present disclosure is a monitoring method being used in a monitoring system including a monitoring device, an optical repeater, and a first MCF transmission path and a second MCF transmission path, wherein each of the first MCF transmission path and the second MCF transmission path includes a plurality of cores, and connects the monitoring device and the optical repeater with each other via the plurality of cores, the monitoring method including: a procedure of inputting an optical pulse from the monitoring device to a first core included in the plurality of cores of the first MCF transmission path; a procedure of looping-back, in the optical repeater, the optical pulse being received from the first core to a second core included in the plurality of cores of the second MCF transmission path; a procedure of receiving, in the monitoring device, the optical pulse being looped-back, as an optical reception pulse, from the plurality of cores of the second MCF transmission path; and a procedure of calculating a corrected reception level, based on the optical reception pulse.

The present disclosure can reduce an influence of crosstalk being included in a reception level of monitoring light in an MCF transmission path.

BRIEF DESCRIPTION OF THE DRAWINGS

Exemplary features and advantages of the present invention will become apparent from the following detailed description when taken with the accompanying drawings in which:

FIG. 5 is a diagram describing an example of a level of an optical reception pulse when there is crosstalk;

FIG. 8 is a diagram illustrating a detailed configuration example of the monitoring system;

EXAMPLE EMBODIMENT

Example embodiments of the present disclosure will be described below with reference to the drawings. An arrow illustrated in the figures illustrates an orientation of a signal or the like, and is not intended to limit a characteristic of a signal or the like. In addition, in the example embodiments and the drawings, the same reference sign is given to an above-mentioned element, and redundant description thereof may be omitted.

First Example Embodiment

Figure 1:
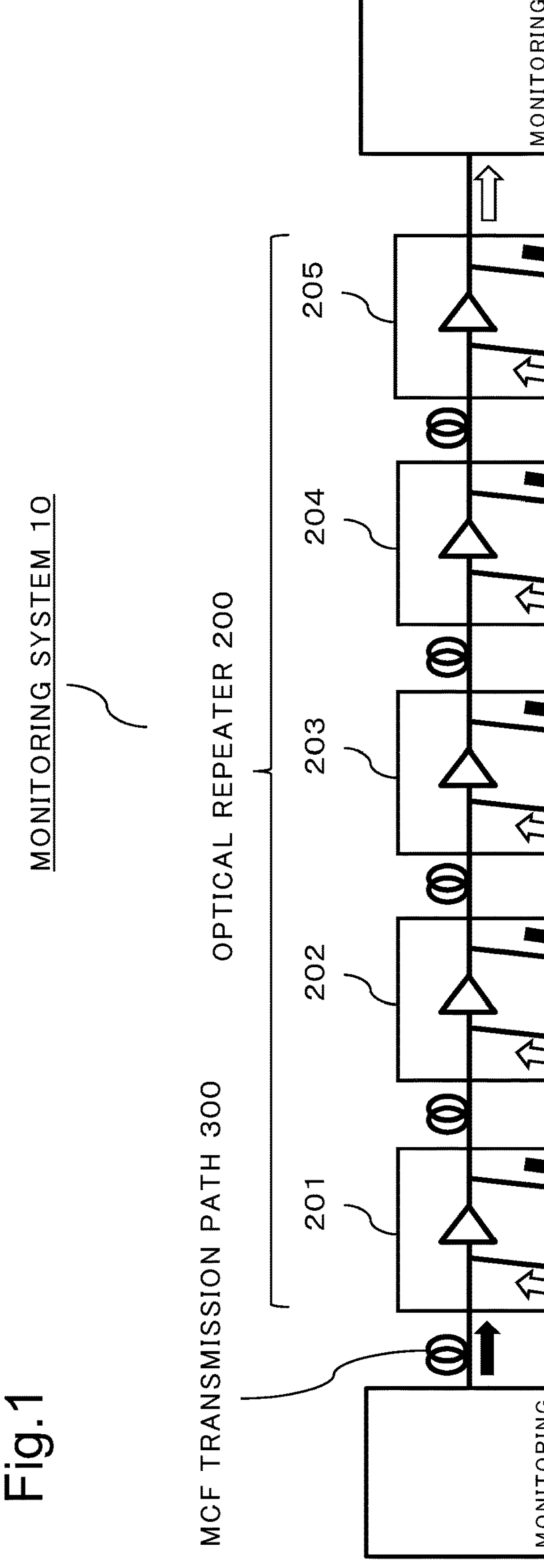
FIG. 1 is a diagram illustrating a configuration example of a monitoring system.

FIG. 1 is a diagram illustrating a configuration example of a monitoring system 10 according to a first example embodiment. The monitoring system 10 includes monitoring devices 100 and 150, a multi-core fiber (MCF) transmission path 300 and an MCF transmission path 400, and optical repeaters 201 to 205. In FIG. 1, a plurality of optical repeaters 201 to 205 are cascaded between the monitoring device 100 and the monitoring device 150. Each of the optical repeaters 201 to 205 has a similar configuration and function. Therefore, in the following description, when the optical repeaters 201 to 205 are collectively referred to, they may be referred to as an optical repeater 200. The monitoring system 10 is a system that provides a monitoring function to an optical transmission system including the MCF transmission path 300, the MCF transmission path 400, and the optical repeaters 201 to 205.

Each of the MCF transmission path 300 and the MCF transmission path 400 is a multi-core fiber including a plurality of cores. In FIG. 1, the MCF transmission path 300 transmits light in a left-to-right direction (hereinafter, referred to as a "downstream direction") in the drawing, and the MCF transmission path 400 transmits light in a right-to-left direction (hereinafter, referred to as an "upstream direction") in the drawing. The MCF transmission path 300 and the MCF transmission path 400 together may also be considered as one MCF transmission path.

The monitoring devices 100 and 150, and the optical repeaters 201 to 205 are communicably connected to one another via a plurality of cores of the MCF transmission path 300 and the MCF transmission path 400. Each of the optical repeaters 201 to 205 includes an optical amplifier for amplifying transmitted light and a loopback circuit for looping-back monitoring light for each optical path of a core of each of the MCF transmission path 300 and the MCF transmission path 400. Then, each of the optical repeaters 201 to 205 loops-back the monitoring light at an output side of the optical amplifier. The optical repeaters 201 to 205 including a loopback circuit for looping-back the monitoring light in this manner have generally been known.

The monitoring device 100 is capable of connecting to the optical repeater 200 via the MCF transmission path 300 and the MCF transmission path 400. The monitoring device 100 transmits monitoring light (black arrow in FIG. 1) to one of the cores of the MCF transmission path 300 in order to monitor states of the MCF transmission path 300, the MCF transmission path 400, and the optical repeater 200. In the present example embodiment, the monitoring light is an optical pulse. The loopback circuit of the optical repeater 200 splits an optical pulse being input from the MCF transmission path 300. One of the split optical pulses is looped-back to the MCF transmission path 400, and received by the monitoring device 100. A plurality of cores of the MCF transmission path 300 are connected to a plurality of cores of the MCF transmission path 400 in a one-to-one manner via the loopback circuit of the optical repeater 200. The other optical pulse split by an optical coupler propagates through the MCF transmission path 300, and proceeds to another adjacent optical repeater 200.

Meanwhile, the monitoring device 150 transmits an optical pulse (a void arrow in FIG. 1) being monitoring light to one of cores of the MCF transmission path 400. Then, the monitoring device 150 receives an optical pulse being looped-back by each of the optical repeaters 201 to 205 from the MCF transmission path 300. A function of the monitoring device 150 is similar to that of the monitoring device 100 except that a propagation direction of the optical pulse is different.

Hereinafter, a case where each of the MCF transmission path 300 and the MCF transmission path 400 is a four-core MCF, and five optical repeaters 201 to 205 are cascaded, is described. However, it is obvious that the following description can be applied to a case where the number of cores of the MCF transmission path 300 and the MCF transmission path 400 is other than four cores, and a case where the number of cascaded optical repeaters 200 is other than five.

Figure 2:
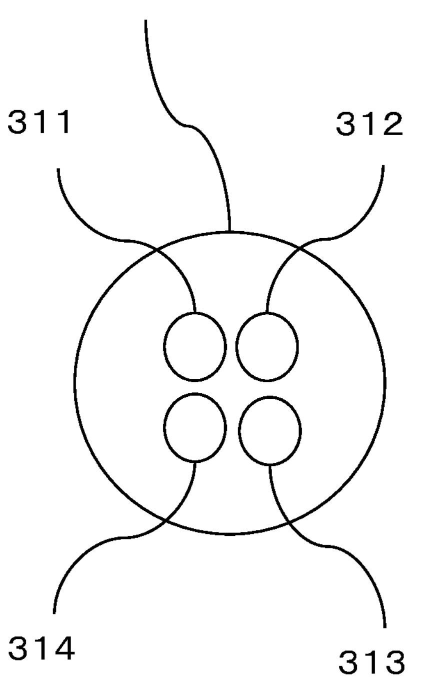
FIG. 2 is a diagram illustrating an example of a cross section of an MCF transmission path.
Figure 3:
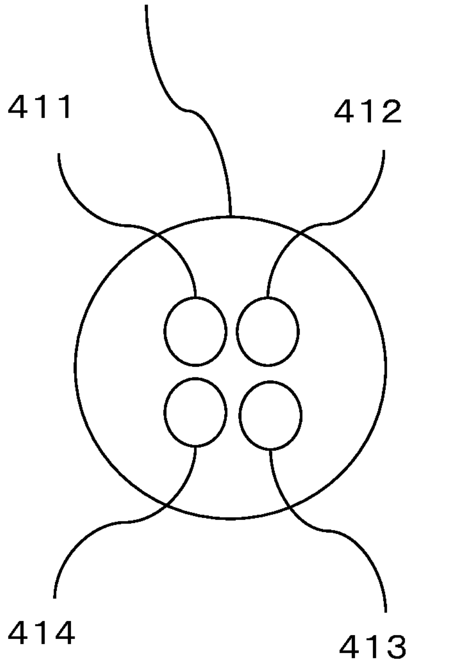
FIG. 3 is a diagram illustrating an example of a cross section of the MCF transmission path.

Each of FIGS. 2 and 3 illustrates an example of a cross section of the MCF transmission path 300 and an example of a cross section of the MCF transmission path 400. The MCF transmission path 300 includes cores 311 to 314, and the MCF transmission path 400 includes cores 411 to 414. Note that, each of the MCF transmission path 300 and the MCF transmission path 400 may be a part of one MCF transmission path having eight or more cores.

Figure 4:
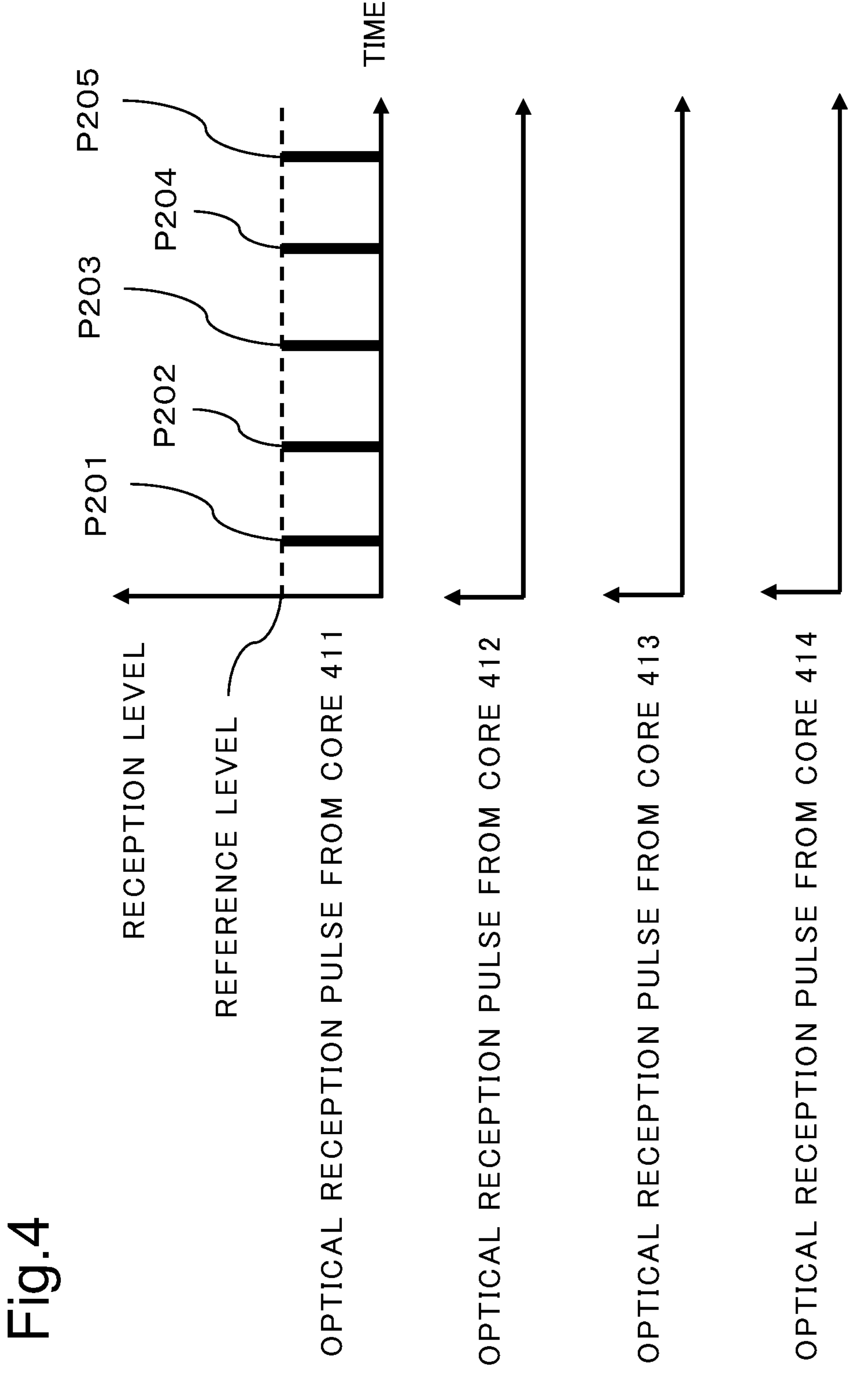
FIG. 4 is a diagram describing an example of a level of an optical reception pulse when there is no crosstalk.

FIG. 4 is a diagram describing an example of a reception level of an optical pulse received from the MCF transmission path 400 in the monitoring apparatus 100 when there is no crosstalk among the cores 311 to 314 and among the cores 411 to 414. A vertical axis associates to a level of an optical pulse (optical reception pulse) being received by the monitoring device 100, and a horizontal axis represents time. Note that, in the following description, crosstalk between cores in the same MCF is simply referred to as "crosstalk".

Each of the optical repeaters 201 to 205 loops-back an optical pulse for each core, from the MCF transmission path 300 to the MCF transmission path 400. FIG. 4 illustrates an example of a case where an optical pulse transmitted by the monitoring device 100 to the core 311 of the MCF transmission path 300 is looped-back to the MCF transmission path 400 in the optical repeaters 201 to 205. When the monitoring device 100 transmits one optical pulse to the core 311, the optical pulse being looped-back by each of the optical repeaters 201 to 205 is received from the core 411 as a pulse train including five optical pulses. A reception time of each of the optical pulses is slower as the optical pulse is looped-back at the optical repeater far from the monitoring device 100. That is, in FIG. 4, the five optical reception pulses are looped-back by the optical repeaters 201, 202, 203, 204, and 205 in order from a left. In FIG. 4 and the following similar drawings, for example, an optical pulse being looped-back by the optical repeater 201 is referred to as "P201".

Each of the MCF transmission path 300 and the core 311 can be referred to as a first MCF transmission path and a first core, respectively. Each of the MCF transmission path 400 and the core 411 can be referred to as a second MCF transmission path and a second core, respectively. Then, the first core and the second core may be included in a single MCF transmission path. In such a single MCF transmission path, a propagation direction of an optical pulse propagating through the first core and a propagation direction of an optical pulse propagating through the second core are different from each other.

When there is no crosstalk among the cores of the MCF transmission path 300 and among the cores of the MCF transmission path 400, as illustrated in FIG. 4, an optical pulse transmitted to the core 311 is received only by the core 411. Therefore, by confirming the reception level of the optical reception pulse received from the core 411, it is possible to monitor presence or absence of a failure (e.g., an increase in loss) in a path through which each of the optical pulses propagates.

Herein, in the diagram illustrating the reception level of the optical reception pulse of the present example embodiment, the vertical axis is an amplitude (hereinafter, referred to as a "reference level") indicated by a horizontal broken line when there is no difference between an immediately preceding optical reception pulse and the reception level. For example, in FIG. 4, the optical reception pulse immediately before an optical reception pulse P202 is the optical reception pulse P201. That is, "the reception level of an immediately preceding optical reception pulse" is the reception level of an optical pulse being looped-back by the optical repeater one step closer to the monitoring devices 100. In addition, in a certain optical reception pulse, when the reception level becomes lower than an immediately preceding optical reception pulse, the reception level of the optical reception pulse is indicated at a level lower than the reference level in response to a level difference. For example, when the reception level of the optical reception pulse P202 being looped-back by the optical repeater 202 decreases, a level of the optical reception pulse P202 is illustrated to be lower than the reference level in FIG. 4. In this case, in optical reception pulses P203 to P205 after the optical reception pulse P202, when the reception level is similar to the level of the optical reception pulse P202, the level of the subsequent optical pulse is displayed as the reference level. In other words, the reception level indicated by the vertical axis in FIG. 4 associates to a value relative to the reception level of the immediately preceding optical reception pulse. In FIG. 4, since the level of the optical reception pulse is constant, the level of the optical reception pulse from the core 411 is constant.

In addition, a gain of the optical amplifier included in the optical repeater 200 is set in such a way as to compensate for a loss at a normal state of the MCF transmission paths 300 and 400 being connected to the optical repeater 200, and the optical repeater 200. Therefore, in the normal state, as illustrated in FIG. 4, the level of the optical reception pulse is substantially equal regardless of whether a point to be looped-back is any of the optical repeaters 201 to 205. On the other hand, when there is an increase in loss (for example, about 3 dB) to an extent that any of the MCF transmission paths 300 and 400 and the optical repeaters 201 to 205 is determined to have a failure, the level of the optical pulse received by the monitoring device 100 decreases to a level being capable of distinguishing from the normal state.

FIG. 5 illustrates an example of the reception level of an optical reception pulse when there is crosstalk in the MCF transmission path 300 or the MCF transmission path 400. Even when there is crosstalk among the cores of the MCF transmission path 300 or among the cores of the MCF transmission path 400, and the monitoring device 100 transmits an optical pulse only to the core 311, it indicates that an optical pulse has been received from the cores 412, 413, and 414. Note that, in FIG. 5, the optical pulses from the cores 412 to 414 are not received in a path being looped-back by the optical repeater 201. This indicates that there may be less crosstalk in the path where an optical pulse is looped-back in the optical repeater 201. Note that, the amplitude of the reception level illustrated in FIG. 5 is for describing variation, and does not strictly associate to an actual reception level.

Since the crosstalk varies depending on an external factor or the like of the MCF transmission path 300 and the MCF transmission path 400, intensity of the received optical pulse may vary at each measurement time. A vertical two-way arrow in FIG. 5 indicates that the level varies with the measurement time. Therefore, when only the reception level of the optical reception pulse received from the core 411 is monitored as in a general monitoring device, there is a possibility that a decrease in the reception level due to crosstalk is erroneously detected as a transmission path failure. Note that, the "transmission path failure" herein includes a case where a decrease in the reception level is caused by a failure of the optical repeater 200.

Figure 6:
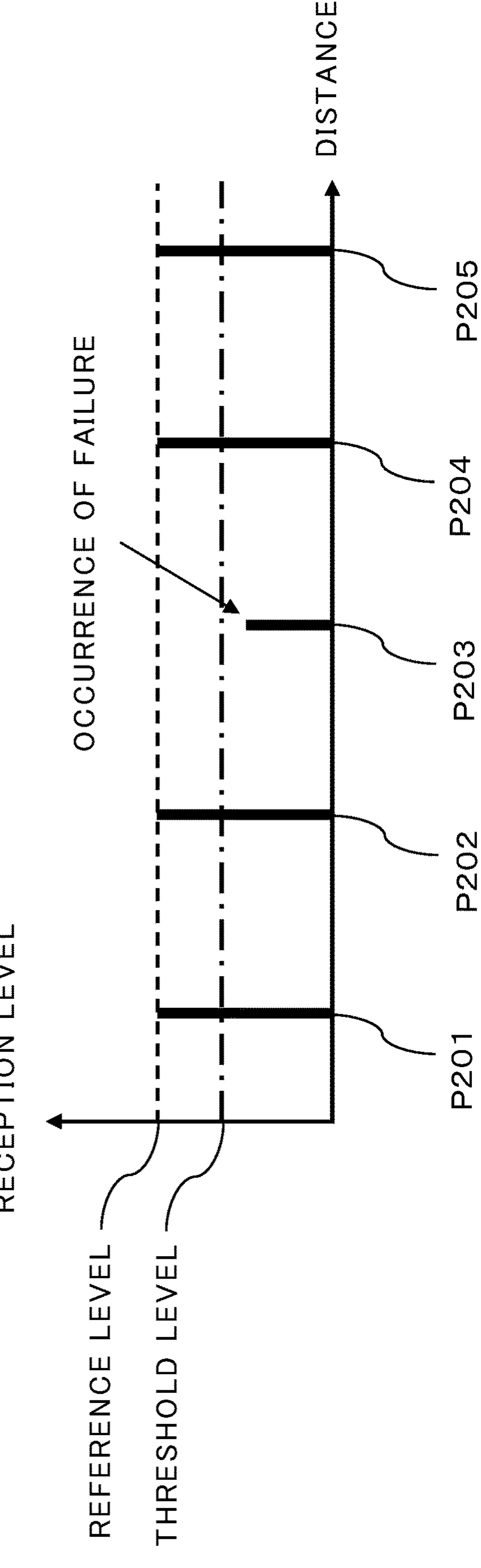
FIG. 6 is a diagram describing an example of detection of a failure when there is no crosstalk.
Figure 7:
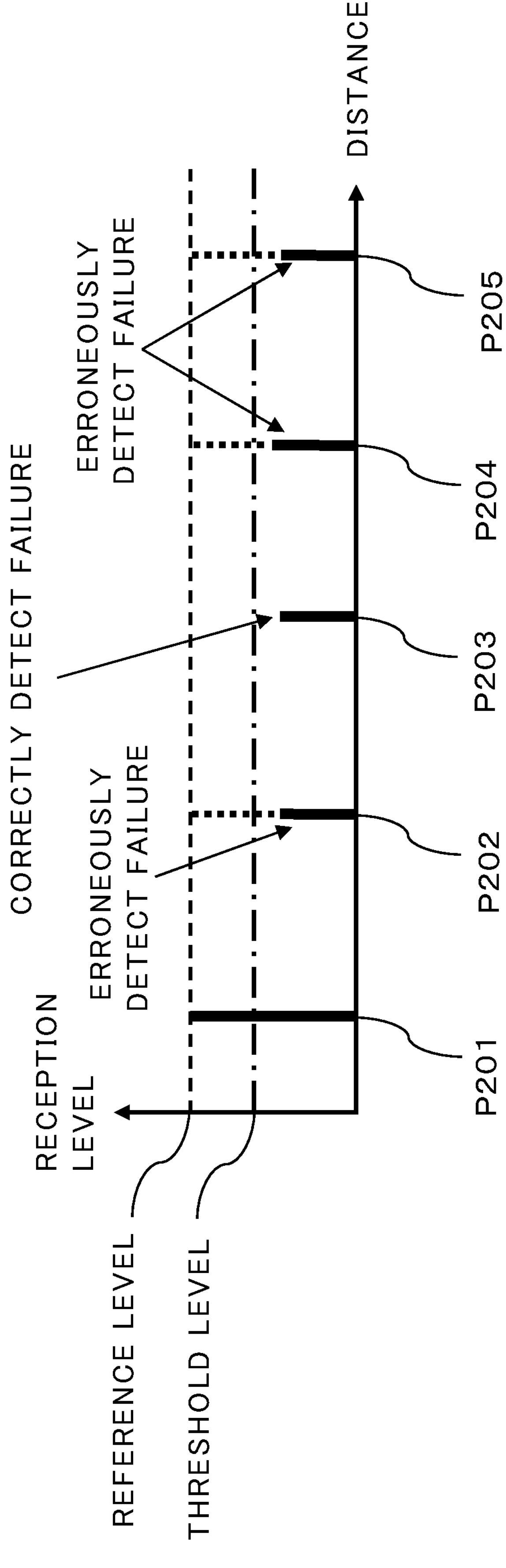
FIG. 7 is a diagram describing an example of detection of a failure when there is crosstalk.

FIGS. 6 and 7 are diagrams for describing an example of detection of a failure, based on presence or absence of crosstalk. FIG. 6 is an example of a case where there is no crosstalk. In FIG. 6, there is a failure on the core of the path being looped-back by the optical repeater 203, and the reception level of the associated optical reception pulse P203 is decreased. A horizontal dashed-dotted line indicates a threshold level of occurrence of a failure, and when the reception level becomes equal to or less than the threshold level, it can be determined that the failure occurs. In FIG. 6, since the reception level is not affected by crosstalk, presence or absence of a failure can be correctly detected. When there is no failure in the path being looped-back in the optical repeaters 204 and 205 after a failure occurrence point, the level of the subsequent optical reception pulse does not change. Therefore, as described above, the reception level of the optical reception pulse after the optical reception pulse indicating the failure is indicated by the reference level.

Next, with reference to FIG. 7, a problem that occurs in a general monitoring apparatus in a case where there is crosstalk in at least one of the MCF transmission path 300 and the MCF transmission path 400 will be described. It is similar to FIG. 6 that the reception level of the optical reception pulse P203 is decreased due to a failure on the core of the path being looped-back by the optical repeater 203. In FIG. 7, the reception levels of the optical reception pulses P202, P204, and P205 received from the core 411 are also decreased due to the crosstalk of the core of the path being looped-back by the optical repeater 202, the optical repeater 204, and the optical repeater 205. Therefore, as a result of the level of the optical reception pulse received from the core 411 changing beyond the threshold level than an original normal level, there is a possibility that a failure occurs on the path of these optical reception pulses may be erroneously recognized.

In the present example embodiment, a monitoring system and a monitoring device each having a configuration for suppressing erroneous detection of a transmission path failure caused by crosstalk of each of the MCF transmission path 300 and the MCF transmission path 400 will be described.

FIG. 8 is a diagram illustrating a detailed configuration example of the monitoring system 10 according to the first example embodiment. The monitoring system 10 includes the monitoring device 100, the optical repeater 201, the MCF transmission path 300, and the MCF transmission path 400. The monitoring device 100 includes an optical pulse transmission circuit 110, and an optical pulse reception circuit 120. In FIG. 8, description of the second and subsequent optical repeaters 202 to 205 and the monitoring device 150 is omitted. The optical pulse transmission circuit 110 is responsible for an optical transmission means. The optical transmission means generates an optical pulse, and transmits the optical pulse, as an optical transmission pulse, to the core 311 (i.e., the first core) being one of a plurality of the cores included in the MCF transmission path 300. An optical time domain reflectometer (OTDR) may be used as the optical pulse transmission circuit 110.

The optical repeater 200 loops-back an optical pulse received from the core 311 to the core 411 (i.e., the second core), being one of a plurality of the cores of the MCF transmission path 400.

The optical pulse reception circuit 120 receives, as an optical reception pulse, an optical pulse being looped-back to the MCF transmission path 400 from a plurality of the cores included in the MCF transmission path 400. Further, the optical pulse reception circuit 120 calculates a corrected reception level, based on the optical reception pulse. The optical pulse reception circuit 120 having such a function is one example of an optical reception means. The optical pulse reception circuit 120 calculates, for example, a corrected reception level acquired by summing the reception levels of each of beams of light associated to the optical pulse received from the cores 411 to 414 of the MCF transmission path 400.

The monitoring system 10 and the monitoring device 100 having such a configuration can reduce an influence of crosstalk included in a reception level of monitoring light of an MCF transmission path. The reason for this will be described below.

As described in FIGS. 5, 7, and the like, when there is crosstalk in the MCF transmission path 300 or 400, power of the optical pulse is dispersed in a plurality of cores, and thus the reception level of the optical reception pulse for each core may vary greatly. Therefore, in a general monitoring apparatus, there is a possibility that a transmission path failure is erroneously detected.

In the monitoring device 100 according to the present example embodiment, the optical pulse transmission circuit 110 transmits an optical pulse to the core 311 of the MCF transmission path 300. The optical pulse reception circuit 120 receives the optical pulse being looped-back in each of the optical repeaters 201 to 205, as an optical reception pulse, from each of the cores 411 to 414 of the MCF transmission path 400, and acquires a corrected reception level by summing the levels of the optical reception pulses.

Figure 9:
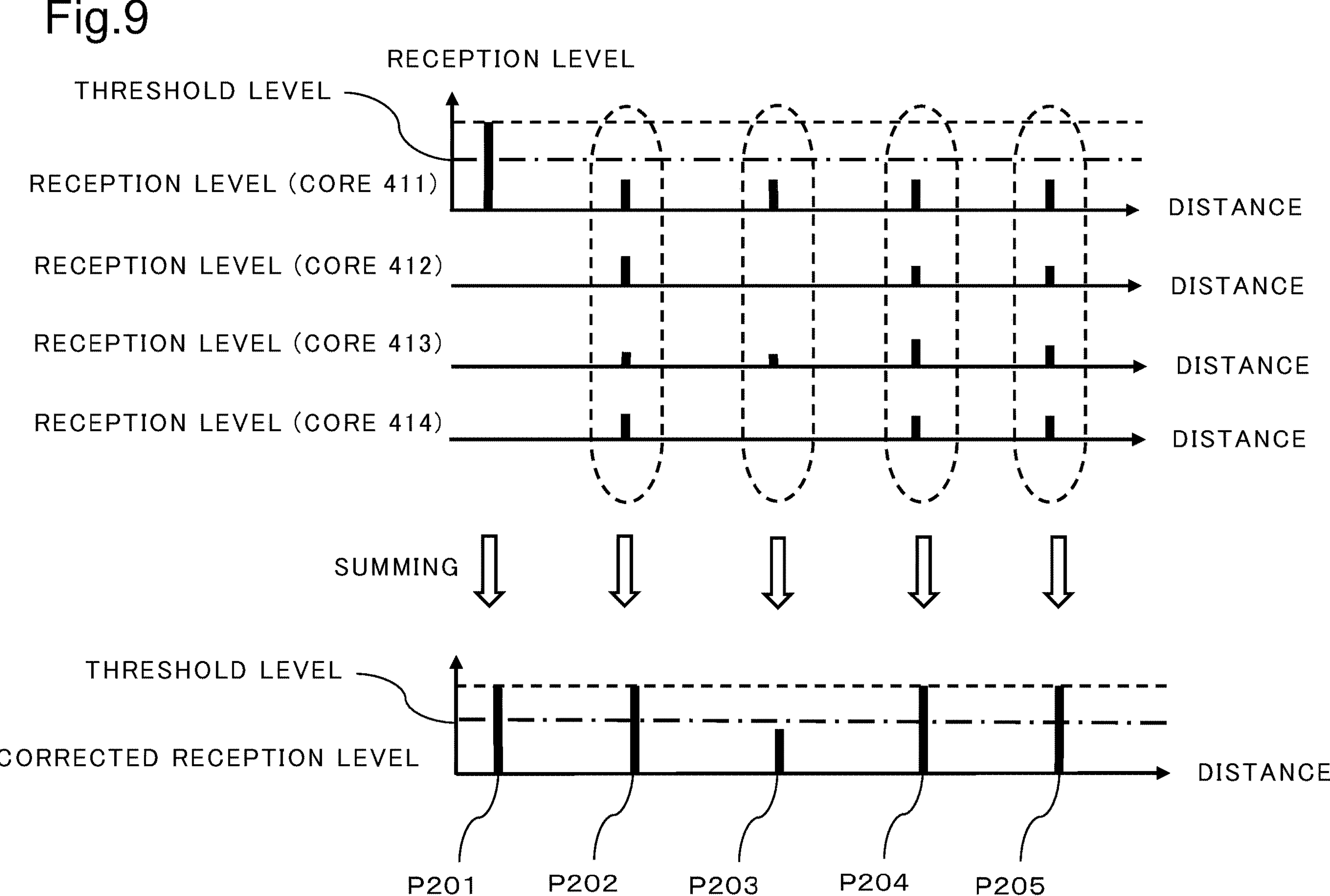
FIG. 9 is a diagram describing an example of summing levels in an optical pulse reception circuit.

FIG. 9 is a diagram for describing an example of summing the reception levels in the optical pulse reception circuit 120. The optical pulse reception circuit 120 acquires the reception levels of each of the optical pulses received from each of the cores 411 to 414 of the MCF transmission path 400. For this function, the optical pulse reception circuit 120 includes photoelectric conversion circuits 121 to 124 and a signal processing circuit 125. Each of the photoelectric conversion circuits 121 to 124 is provided in association to each of the cores 411 to 414 of the MCF transmission path 400 in a one-to-one manner. Each of the photoelectric conversion circuits 121 to 124 converts an optical reception pulse into a level signal. The level signal is an electric signal having an amplitude indicating a reception level of each of the optical reception pulses received from the cores 411 to 414. Each of the photoelectric conversion circuits 121 to 124 is responsible for a photoelectric conversion means for outputting a reception level acquired in response to an optical reception pulse as an electric signal for each core.

The signal processing circuit 125 performs an arithmetic operation of summing the amplitudes of the level signals being input from the photoelectric conversion circuits 121 to 124, and outputs the arithmetic operation result as a corrected reception level. The signal processing circuit 125 is responsible for a signal processing means for calculating a corrected reception level by summing the levels indicated by electric signals for each of the cores 411 to 414.

The arithmetic operation of the corrected reception level is performed on the reception level of the optical reception pulse being generated from the same optical transmission pulse and looped-back by the same optical repeater. In FIG. 9, the amplitude of the level signal to be summed is indicated surrounded by a dashed line. That is, the optical pulse reception circuit 120 may calculate the corrected reception level, based on the reception level of the optical pulse received from the MCF transmission path 400 at a substantially same time.

In the example in FIG. 9, any of the reception levels of the optical reception pulses P202 to P205 of the core 411 is below the threshold level due to crosstalk. Therefore, the reception level of the core 411 indicates that the level of the optical pulse after the optical reception pulse P202 is further reduced. However, only the path of the optical reception pulse P203 actually decreases the reception level due to a failure, and the decrease in the reception level of the optical reception pulses P202, P204, and P205 in the core 411 is caused by the crosstalk. Therefore, when presence or absence of a failure is determined only by the reception level of the core 411, the failure is erroneously detected in the optical reception pulses P202, P204, and P205. However, by using the corrected reception level in place of the level of the optical reception pulse in one core, it becomes possible to correctly detect presence or absence of a transmission path failure even when there is an influence of crosstalk.

The corrected reception level is a sum of the reception levels for a plurality of optical reception pulses being generated from the same optical transmission pulse and received from the cores 411 to 414 in the optical pulse reception circuit 120. Herein, a "certain path" is, for example, a path being looped-back in the optical repeater 202. That is, the corrected reception level includes power of the optical pulse being leaked to at least any of a core other than the core 311 and a core other than the core 411 due to crosstalk. In other words, the corrected reception level indicates a level at which a level variation due to crosstalk of the reception level of the optical reception pulse is compensated. As illustrated in a lower part of FIG. 9, by using the corrected reception level, the optical pulse reception circuit 120 can compensate for the level of light being looped-back.

Note that, the optical pulse reception circuit 120 may calculate the corrected reception level, based on the reception level of the optical reception pulse received from all of the plurality of cores of the MCF transmission path 400. Alternatively, the optical pulse reception circuit 120 may calculate the corrected reception level, based on the reception level of the optical reception pulse received from two or more cores of the MCF transmission path 400. For example, only an optical reception pulse whose reception level is equal to or more than a predetermined value may be a target of calculation of the corrected reception level. As a result, it is possible to exclude a core having small crosstalk from a target of the calculation of the corrected reception level, and to reduce an amount of arithmetic operation when calculating the corrected reception level. Further, the corrected reception level may be calculated based on a level of the spatially summed optical reception pulses without converting the level of the light received from the MCF transmission path 400 for each core into an electric signal.

In addition, an optical pulse may be transmitted to the MCF transmission path 300 a plurality of times, and the corrected reception level acquired in response to each of the optical pulses may be averaged. By averaging the corrected reception level measured at different times, an influence of an amount of crosstalk in a temporal variation due to a variation in temperature or pressure around the monitoring system 10 and the like can be averaged. As a result, it is possible to prevent a transient loss variation from affecting the corrected reception level.

Further, the optical pulse reception circuit 120 does not need to set the level of the optical reception pulses received from all the cores of the MCF transmission path 400 as a target of summing. When a core group being affected by crosstalk is limited, only the levels of the optical reception pulses acquired from the limited core group may be summed. The crosstalk of each of the MCF transmission path 300 and the MCF transmission path 400 may be measured in advance, and the reception level of the optical reception pulse of the core group having a large amount of the measured crosstalk may be set as a target of summing of the optical reception levels. As a result, a calculation amount of the signal processing circuit 125 can be reduced.

Second Example Embodiment

Figure 10:
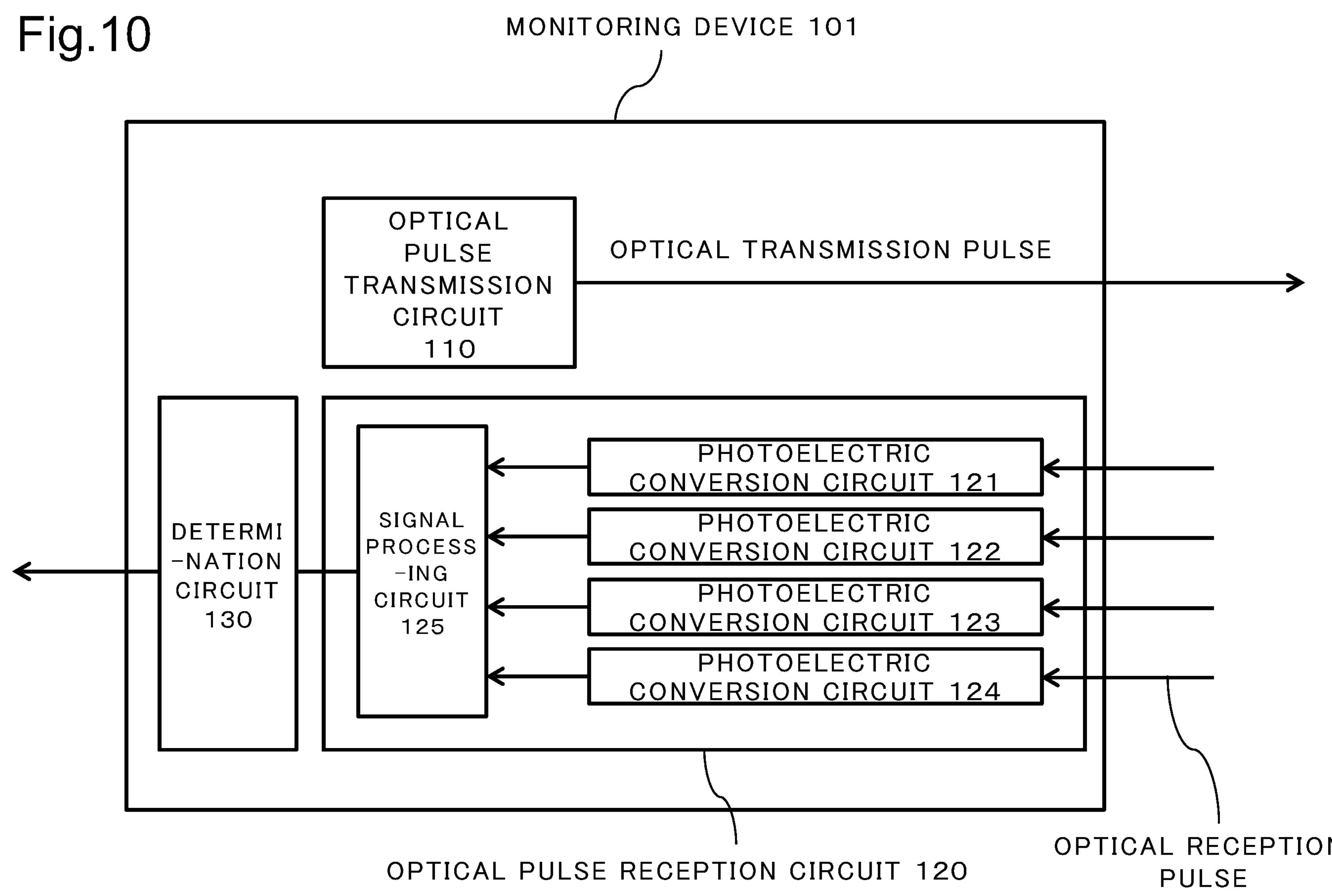
FIG. 10 is a diagram illustrating a configuration example of a monitoring device.

FIG. 10 is a diagram illustrating a configuration example of a monitoring device 101 according to a second example embodiment. The monitoring device 101 includes a determination circuit 130 in addition to a configuration of the monitoring device 100. The determination circuit 130 is responsible for a determination means for determining presence or absence of a failure in a path on which an optical pulse is looped-back by using a corrected reception level to be output from a signal processing circuit 125, and outputting a result of the determination. A determination condition is, for example, a threshold level illustrated in FIG. 9. The determination condition may be written in advance in a nonvolatile memory or the like of the determination circuit 130. A method of outputting a determination result of presence or absence of a failure is not particularly limited. The determination result may be notified to another device by an electric signal, or may be notified to an administrator of the monitoring device 101 by sound or image. The monitoring device 101 can be used in place of the monitoring device 100 according to the first example embodiment. Similarly to the monitoring device 100, the monitoring device 101 can also reduce an influence of crosstalk included in a reception level of monitoring light in an MCF transmission path. Then, the monitoring device 101 can output a result of determining presence or absence of a failure in a path in which an optical pulse is looped-back, by using a corrected reception level in which an influence of crosstalk is reduced.

Third Example Embodiment

Figure 11:
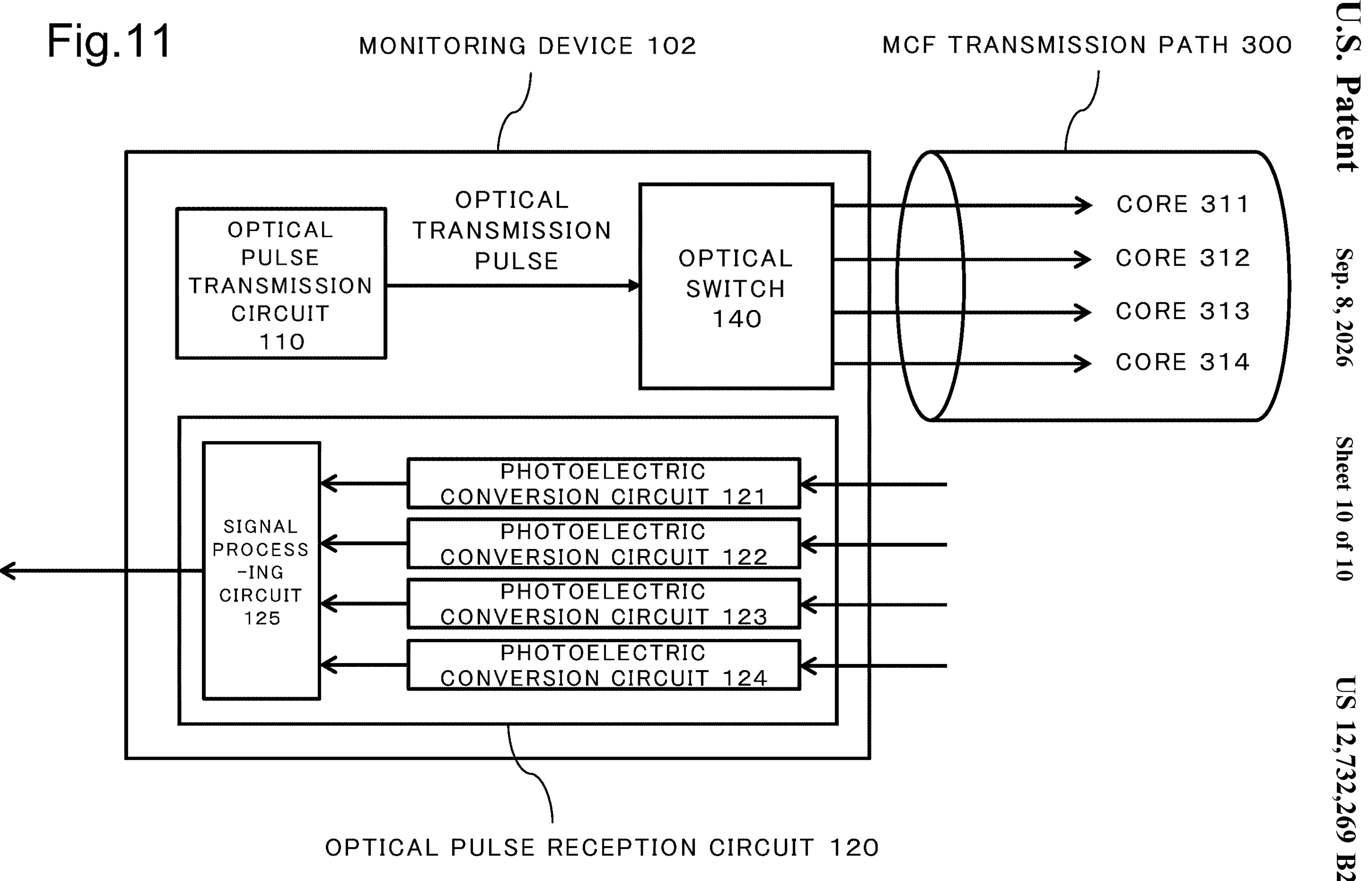
FIG. 11 is a diagram illustrating a configuration example of the monitoring device.

FIG. 11 is a diagram illustrating a configuration example of a monitoring device 102 according to a third example embodiment. The monitoring device 102 is different from the monitoring device 100 in that the monitoring device 102 includes an optical switch 140. The optical switch 140 is a 1×4 optical switch having one input port and four output ports. The optical switch 140 transmits, to one of the four output ports, an optical pulse (optical transmission pulse) being input from an optical pulse transmission circuit 110 to the input port. Each of the outputs of the optical switch 140 is connected to cores 311 to 314 of an MCF transmission path 300, respectively. That is, the optical switch 140 can select one core from a plurality of the cores 311 to 314 of the MCF transmission path 300, and output an optical pulse to the selected core.

By using the optical switch 140, the monitoring device 102 can select the core of the MCF transmission path 300 to which an optical transmission pulse is input. Then, by transmitting an optical transmission pulse to different cores and comparing a corrected reception levels acquired from each of results, it is possible to confirm a state of a transmission path for each core being input the optical transmission pulse. In this case, a signal processing circuit 125 may calculate the corrected reception level in association with the selected core. Similarly to the monitoring device 100, the monitoring device 102 can reduce an influence of crosstalk included in a reception level of monitoring light received from an MCF transmission path, and may further include a determination circuit 130.

Some or all of the functions and procedures of the monitoring devices 100 to 102 described in the above example embodiments may be achieved by a central processing unit (CPU) included in each of the monitoring devices 100 to 102 executing a program. The program is recorded in a fixed and non-transitory recording medium. A semiconductor memory or a fixed magnetic disk device is used as the recording medium, but the present invention is not limited thereto.

Note that, the example embodiments of the present disclosure may be described as the supplementary note below, but the present disclosure is not limited thereto.

(Supplementary Note 1)

A monitoring system including:

a monitoring device including an optical transmission means and an optical reception means; an optical repeater; and a first multi-core fiber (MCF) transmission path and a second MCF transmission path, wherein each of the first MCF transmission path and the second MCF transmission path includes a plurality of cores, and connects the monitoring device and the optical repeater with each other via the plurality of cores, the optical transmission means generates an optical pulse, and inputs the optical pulse to a first core included in the plurality of cores of the first MCF transmission path, the optical repeater loops-back the optical pulse being received from the first core to a second core included in the plurality of cores of the second MCF transmission path, and the optical reception means receives the optical pulse being looped-back, as an optical reception pulse, from the plurality of cores of the second MCF transmission path, and calculates a corrected reception level, based on the optical reception pulse.

(Supplementary Note 2)

The monitoring system according to supplementary note 1, wherein the corrected reception level is calculated by summing reception levels of the optical reception pulses.

(Supplementary Note 3)

The monitoring system according to supplementary note 1 or 2, wherein the corrected reception level is calculated based on a reception level of an optical reception pulse being received from all of the plurality of cores of the second MCF transmission path.

(Supplementary Note 4)

The monitoring system according to any one of supplementary notes 1 to 3, wherein the optical reception means calculates the corrected reception level, based on a reception level of the optical reception pulse being received at a substantially same time.

(Supplementary Note 5)

The monitoring system according to supplementary note 4, wherein the optical reception means includes a photoelectric conversion means for outputting the reception level as an electric signal for each core of the second MCF transmission path, and a signal processing means for calculating the corrected reception level by summing levels indicated by the electric signal for each of the cores.

(Supplementary Note 6)

The monitoring system according to any one of supplementary notes 1 to 4, wherein the optical reception means calculates the corrected reception level, based on a level of light acquired by spatially summing reception levels of the optical reception pulses.

(Supplementary Note 7)

The monitoring system according to any one of supplementary notes 1 to 6, wherein the monitoring device includes an optical switch that selects the first core from the plurality of cores of the first MCF transmission path and outputs the optical pulse to the first core, and the optical reception means calculates the corrected reception level in association with the selected first core.

(Supplementary Note 8)

The monitoring system according to any one of supplementary notes 1 to 7, wherein the monitoring device includes a determination means for outputting a result of determining a state of a path through which the optical pulse propagates, by using the corrected reception level.

(Supplementary Note 9)

The monitoring system according to any one of supplementary notes 1 to 8, wherein a propagation direction of an optical pulse propagating through the first core and a propagation direction of an optical pulse propagating through the second core are different from each other, and a single MCF transmission path includes the first core and the second core.

(Supplementary Note 10)

A monitoring device being capable of connecting to a first multi-core fiber (MCF) transmission path and a second MCF transmission path that each include a plurality of cores, the monitoring device including:

an optical transmission means for generating an optical pulse, and inputting the optical pulse to a first core included in the plurality of cores of the first MCF transmission path; and an optical reception means for receiving the optical pulse, as an optical reception pulse, from the plurality of cores of the second MCF transmission path, and calculating a corrected reception level, based on the optical reception pulse.

(Supplementary Note 11)

A monitoring method being used in a monitoring system including a monitoring device including an optical transmission means and an optical reception means, an optical repeater, and a first multi-core fiber (MCF) transmission path and a second MCF transmission path, wherein each of the first MCF transmission path and the second MCF transmission path includes a plurality of cores, and connects the monitoring device and the optical repeater with each other via the plurality of cores, the monitoring method including:

inputting an optical pulse from the monitoring device to a first core included in the plurality of cores of the first MCF transmission path;

looping-back, in the optical repeater, the optical pulse being received from the first core to a second core included in the plurality of cores of the second MCF transmission path;

receiving, in the monitoring device, the optical pulse being looped-back, as an optical reception pulse, from the plurality of cores of the second MCF transmission path; and calculating a corrected reception level, based on the optical reception pulse.

(Supplementary Note 12)

A method of controlling a monitoring device being capable of connecting to a multi-core fiber (MCF) transmission path including a plurality of cores, the method including:

inputting an optical pulse to a first core included in the plurality of cores;

receiving the optical pulse as an optical reception pulse from the plurality of cores; and calculating a corrected reception level, based on the optical reception pulse.

While the present disclosure has been shown and described with reference to the example embodiments, the present disclosure is not limited to the above-described example embodiments. It will be understood by those of ordinary skill in the art that various changes in form and details may be made therein without departing from the spirit and scope of the present disclosure as defined by the claims. For example, the present disclosure is applied to an optical submarine cable system and a land-based optical transmission system. The example embodiments also disclose a monitoring system including a monitoring device, the monitoring device, a monitoring method used in the monitoring system, and a procedure of a control method of the monitoring device.

Further, the configurations described in each of the example embodiments are not necessarily mutually exclusive. An advantageous effect of the present disclosure may be achieved by a configuration in which all or a part of the above-described example embodiments are combined.

REFERENCE SIGNS LIST

10 Monitoring system
100 to 102, 150 Monitoring device
110 Optical pulse transmission circuit
120 Optical pulse reception circuit
121 to 124 Photoelectric conversion circuit
125 Signal processing circuit
130 Determination circuit
140 Optical switch
200 to 205 Optical repeater
300, 400 MCF transmission path
311 to 314, 411 to 414 Core
P201 to P205 Optical reception pulse

The invention claimed is:

1. A monitoring system comprising:

a monitoring device including an optical transmitter and an optical receiver; an optical repeater; a first multi-core fiber (MCF) transmission path; and a second MCF transmission path other than the first MCF transmission path; wherein each of the first MCF transmission path and the second MCF transmission path includes a plurality of cores, and connects the monitoring device and the optical repeater with each other via the plurality of cores, the optical transmitter generates an optical pulse, and inputs the optical pulse to a first core included in the plurality of cores of the first MCF transmission path, the optical repeater loops-back the optical pulse being received from the first core to a second core included in the plurality of cores of the second MCF transmission path, and the optical receiver receives the optical pulse being looped-back, as an optical reception pulse, from the plurality of cores of the second MCF transmission path, and calculates a corrected reception level, based on the optical reception pulse.

2. The monitoring system according to claim 1, wherein the corrected reception level is calculated by summing reception levels of the optical reception pulses.

3. The monitoring system according to claim 1, wherein the corrected reception level is calculated based on a reception level of an optical reception pulse being received from all of the plurality of cores of the second MCF transmission path.

4. The monitoring system according to claim 1, wherein the optical receiver calculates the corrected reception level, based on a reception level of the optical reception pulse being received at a substantially same time.

5. The monitoring system according to claim 4, wherein the optical receiver includes a photoelectric converter configured to output the reception level as an electric signal for each core of the second MCF transmission path, and a signal processor configured to calculate the corrected reception level by summing levels indicated by the electric signal for each of the cores.

6. The monitoring system according to claim 1, wherein the optical receiver calculates the corrected reception level, based on a level of light acquired by spatially summing reception levels of the optical reception pulses.

7. The monitoring system according to claim 1, wherein the monitoring device includes an optical switch that selects the first core from the plurality of cores of the first MCF transmission path and outputs the optical pulse to the first core, and the optical receiver calculates the corrected reception level in association with the selected first core.

8. The monitoring system according to claim 1, wherein the monitoring device includes determination circuit configured to output a result of determining a state of a path through which the optical pulse propagates, by using the corrected reception level.

9. The monitoring system according to claim 1, wherein a propagation direction of an optical pulse propagating through the first core and a propagation direction of an optical pulse propagating through the second core are different from each other, and a single MCF transmission path includes the first core and the second core.

10. A monitoring device being capable of connecting to a first multi-core fiber (MCF) transmission path and a second MCF transmission path other than the first MCF transmission path that each include a plurality of cores, the monitoring device comprising:

an optical transmitter configured to generate an optical pulse, and input the optical pulse to a first core included in the plurality of cores of the first MCF transmission path; and an optical receiver configured to receive the optical pulse, as an optical reception pulse, from the plurality of cores of the second MCF transmission path, and calculate a corrected reception level, based on the optical reception pulse.

11. A monitoring method being used in a monitoring system including a monitoring device including an optical transmitter and an optical receiver, an optical repeater, and a first multi-core fiber (MCF) transmission path and a second MCF transmission path other than the first MCF transmission path; wherein each of the first MCF transmission path and the second MCF transmission path includes a plurality of cores, and connects the monitoring device and the optical repeater with each other via the plurality of cores, the monitoring method comprising:

inputting an optical pulse from the monitoring device to a first core included in the plurality of cores of the first MCF transmission path;

looping-back, in the optical repeater, the optical pulse being received from the first core to a second core included in the plurality of cores of the second MCF transmission path;

receiving, in the monitoring device, the optical pulse being looped-back, as an optical reception pulse, from the plurality of cores of the second MCF transmission path; and calculating a corrected reception level, based on the optical reception pulse.

12. The monitoring system according to claim 2, wherein only an optical reception pulse whose reception level is equal to or greater than a predetermined value is a target of the calculation of the corrected reception level.

13. The monitoring device according to claim 10, wherein the corrected reception level is calculated by summing reception levels of the optical reception pulses.

14. The monitoring device according to claim 10, wherein the corrected reception level is calculated based on a reception level of an optical reception pulse being received from all of the plurality of cores of the second MCF transmission path.

15. The monitoring device according to claim 10, wherein the optical receiver calculates the corrected reception level, based on a reception level of the optical reception pulse being received at a substantially same time.

16. The monitoring device according to claim 15, wherein the optical receiver includes a photoelectric converter configured to output the reception level as an electric signal for each core of the second MCF transmission path, and a signal processor configured to calculate the corrected reception level by summing levels indicated by the electric signal for each of the cores.

17. The monitoring device according to claim 10, wherein the optical receiver calculates the corrected reception level, based on a level of light acquired by spatially summing reception levels of the optical reception pulses.

18. The monitoring device according to claim 10, further comprising an optical switch that selects the first core from the plurality of cores of the first MCF transmission path and outputs the optical pulse to the first core, and the optical receiver calculates the corrected reception level in association with the selected first core.

19. The monitoring device according to claim 10, further comprising a determination circuit configured to output a result of determining a state of a path through which the optical pulse propagates, by using the corrected reception level.

20. The monitoring device according to claim 10, wherein a propagation direction of an optical pulse propagating through the first core and a propagation direction of an optical pulse propagating through the second core are different from each other, and a single MCF transmission path includes the first core and the second core.

* * * * *